Figure 1:
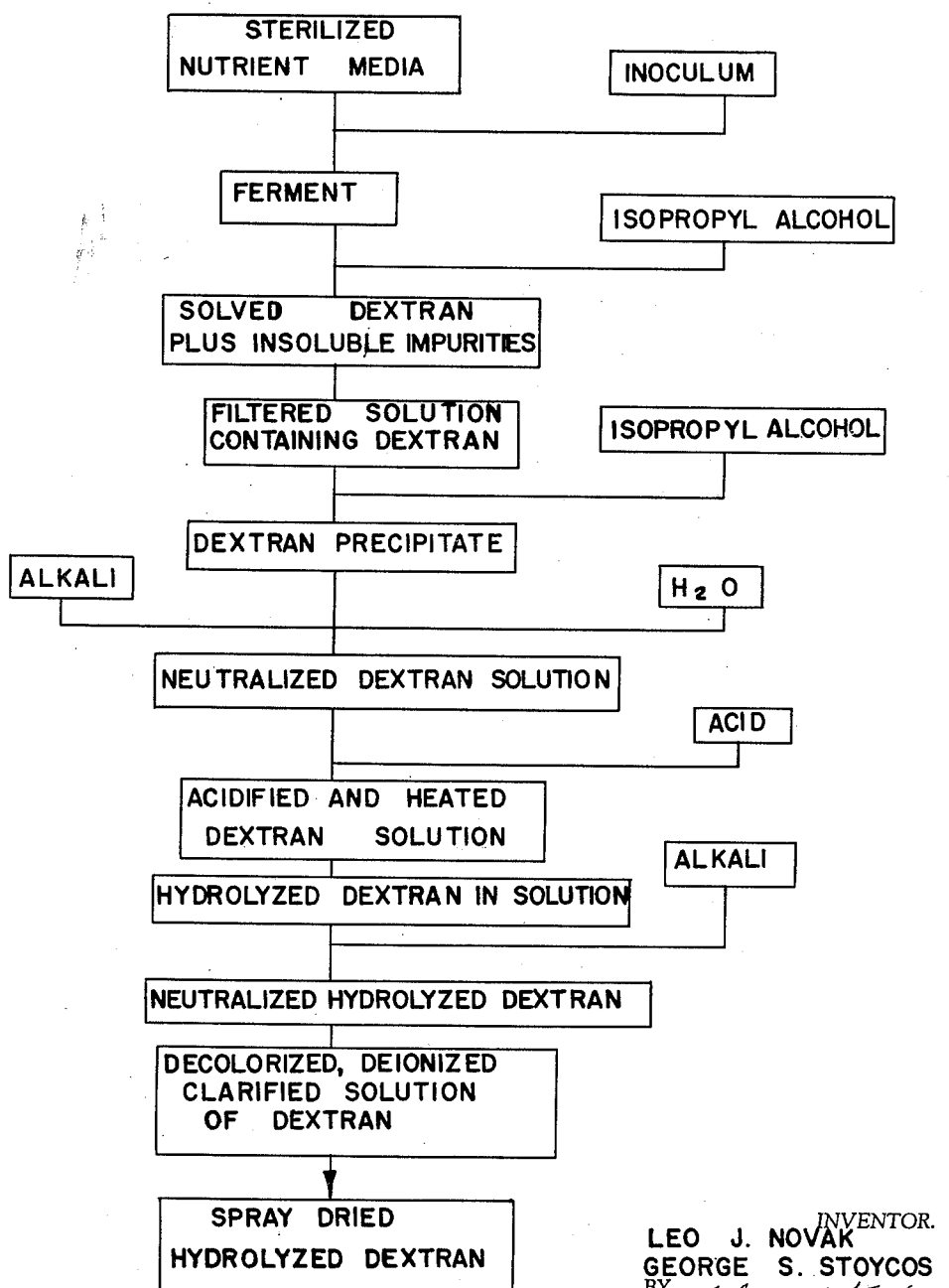

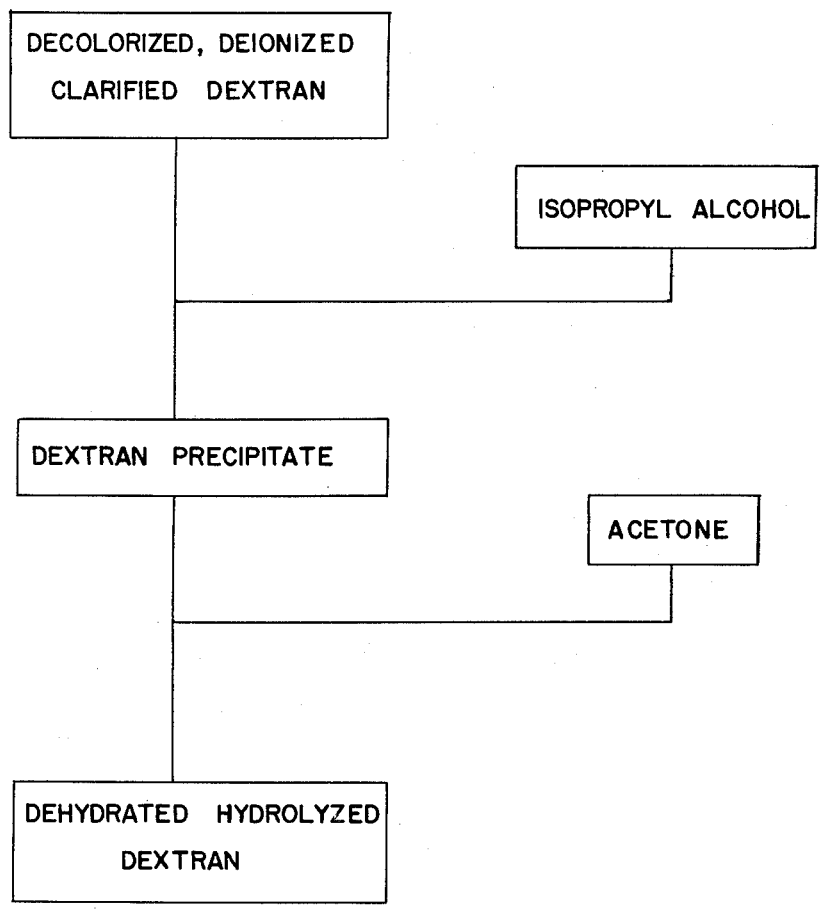

United States Patent Office 2,798,065
Patented July 2, 1957

2,798,065

METHOD FOR ISOLATING SUBSTANTIALLY FREE DEXTRAN FROM FERMENTATES COMPRISING THE SAME

Leo J. Novak and George S. Stoycos, Dayton, Ohio, assignors to The Commonwealth Engineering Company of Ohio, Dayton, Ohio, a corporation of Ohio Application May 21, 1954, Serial No. 431,382

15 Claims. (Cl. 260—209)

This invention relates to improvements in methods for partially hydrolyzing dextran of relatively high molecular weight to dextran products of lower molecular weight.

Dextran is a polysaccharide which may be synthesized from carbohydrates such as refined or raw sugar, molasses or other sucrose-bearing materials by the action of certain microorganisms such as those of the *Leuconostoc mesenteroides* or *L. dextranicum* types, or by the enzyme isolated from cultures of those microorganisms. The usual procedure involves introducing a culture of the selected microorganism, or an aqueous solution of the enzyme isolated from the culture, into a nutrient sucrose-bearing medium and holding the mass until the dextran is produced in maximum yield. The gum dextran thus obtained is a "native" product normally having a mean molecular weight calculated to be in the millions. This high molecular weight is attributed to the co-linkage of a large number of molecules, the polysaccharide units being built up, apparently, by condensation of the glucopyranose units into long chains. The formula of dextran is considered to be $(C_6H_{10}O_5)_n$, $n$ being an integral number.

Dextran of molecular weight in a limited, relatively lower range is used in intravenous injection fluids as a blood plasma extender. This blood plasma extender or "clinical" dextran of comparatively low molecular weight has been obtained by controlled partial hydrolysis of crude "native" high molecular weight dextran produced as generally described hereinabove. The procedure has been to add to the fermentate a water-miscible alcohol or ketone in a concentration in which the crude dextran is insoluble, thus precipitating the dextran, and then purify it and re-dissolve it in acidified water in which it is hydrolyzed to dextran of lower molecular weight. One of the problems encountered in carrying out this procedure is that certain impurities including nitrogenous materials occur in the fermentate with the crude dextran and, unless removed by filtration or centrifuging, are carried down with the precipitated dextran from which they are thereafter difficult to remove. The impurities may remain occluded with the dextran when it is hydrolyzed and complicate the hydrolysis as well as effecting the purity of the partial hydrolyzate and the clarity of solutions thereof prepared for clinical use. On the other hand, both filtration and centrifuging of the highly viscous fermentate are difficult, time-consuming and tedious.

A primary object of the present invention is to provide an improved method in which the crude dextran is precipitated from the nutrient medium in pure or in more readily purified condition.

Some of the impurities existing with the dextran in the fermentate are soluble therein, while other of the impurities are insoluble. We have found that the addition of a controlled, limited amount, generally 15% to 30% by weight, of a water-miscible aliphatic alcohol or ketone of the kind which, at higher concentration, precipitates the dextran from the fermentate, insolubilizes the normally soluble impurities without rendering soluble those which are normally insoluble in the fermentate. Since the addition of the controlled, limited amount of the alcohol or ketone appreciably decreases the viscosity of the fermentate, rendering it relatively fluid and readily handled, i. e., filtered or centrifuged, the important practical aspect is that the fermentate can be filtered or centrifuged without difficulty prior to precipitating the dextran and a purer dextran is precipitated because the impurities are either normally insoluble or are insolubilized by the alcohol or ketone, after addition of the controlled amount thereof, and therefore more impurities are removed by the filtering or centrifuging and the dextran eventually precipitated is consequently more pure if not entirely free from impurities.

Isopropanol is the presently preferred agent for addition to the fermentate in comparatively low concentration for insolubilizing the normally soluble impurities and lowering the viscosity of the fermentate to the extent that it is readily handled, and for addition to the mass remaining after separation of the impurities in an amount such that the total isopropanol concentration is sufficient to precipitate the dextran.

The invention will be more clearly understood by reference to the following specific examples and the accompanying flow sheets in which—

Figure 1 is illustrative of the method in which the clarified dextran solution is spray-dried; and Figure 2 is illustrative of the method in which the dextran is dried by means of acetone.

In one specific embodiment, the sucrose-bearing nutrient is sterilized intermittently and after cooling is preferably immediately inoculated with a strain of *Leuconostoc mesenteroides* such as *L. m.* B–512 (Northern Regional Research Laboratory designation). The nutrient media may contain, by weight, 0.5% casein hydrolysate, enzymatic
0.8% $K_2HPO_4$
0.2 NaCl
0.1% bacto-yeast extract
20.0% sucrose
0.0022% $MnSO_4$ the balance being water.

This nutrient medium is (preferably immediately after the sterilization and cooling) inoculated with a fresh agar slant of the bacteria. The percentage of inoculum used may be 5–10%. After the inoculation, the medium is maintained at 23° C. to 27° C. for 24 to 48 hours. The temperature is more or less critical; temperatures in excess of about 27° C. tend to slow the reaction, thus requiring a longer time for the attainment of a given yield of dextran.

During the fermentation period, the viscosity of the solution, which in the present specific illustration may be taken as a 15-liter batch, increases appreciably, becoming highly viscous, while the pH of the mass drops from an initial value of about 7.1–7.4 to about 3.9–4.1. A drop in the pH to a value in the 3.0–4.1 range is an indication that fermentation is about complete and maximum dextran yield has been attained. The yield of dextran in the viscous mass at this point should be at least 80% of the theoretical.

According to prior practice, the highly viscous fermentate would be subjected to the tedious, time-consuming process of filtration or centrifuging to remove the insoluble impurities as far as possible, and then the alcohol or ketone would be added in an amount to precipitate all of the crude dextran having a certain proportion of the impurities associated therewith. However, in the present method, the alcohol or ketone is now added to the fermentate in the controlled relatively low concentration of 15% to 30% by weight, on the fermentate weight to insolubilize soluble impurities while the dextran, for the most part, remains dissolved in the fermentate, and lower the viscosity of the mass. As indicated previously, it is preferred to use isopropanol. The addition of 15% to 30% of isopropanol to the fermentate inhibits further growth therein, decreases the viscosity so that the mass is more easily handled and insolubilizes the soluble nitrogenous and other impurities so that the impurities can be readily and substantially selectively separated by filtration or centrifuging.

Preferably, the fermentate containing the isopropanol in the controlled concentration is allowed to stand at about room temperature until the alcohol renders the impurities insoluble and removable by filtration or basket centrifuging. A short holding period of 30 minutes to an hour is generally sufficient. The impurities are then separated mechanically, by basket centrifuging or by filtration. Removal of the impurities in this manner leaves a clarified solution of dextran which has a substantially lower nitrogen content than is normally the case, and from which the dextran may be precipitated in considerably purer form.

The mechanical separation of the insoluble impurities from the fermentate of adjusted (decreased) viscosity is preferably effected at a pH of 2-5. The fermentate diluted with the restricted quantity of isopropanol may have, inherently, a pH in that range. If so, no pH adjustment is required. However, if the pH is higher than 5.0, it is adjusted to a value of 2-5, prior to centrifuging or filtering the mass, by the addition of hydrochloric or sulfuric acid.

The dextran solution remaining after the filtering or centrifuging step is usually translucent. The crude dextran is now precipitated from this solution by the alcohol or ketone in a higher concentration at which the dextran is insoluble. The precipitant for the dextran is preferably the same reagent as was added to the fermentate to reduce its viscosity. Thus, in the present illustration, since isopropanol was used to render the impurities insoluble and lower the viscosity, isopropanol is also used to precipitate the dextran from the clarified solution but in higher concentrations of from 35% to 50% by weight. The dextran, carrying with it some isopropanol and water, settles to the bottom of the container and the supernatant can be readily decanted off.

The crude dextran precipitate may be further washed with isopropanol to remove any impurities clinging to it.

This product may be dried and reduced to particulate condition if it is to be used as such.

However, if it is to be partially hydrolyzed to lower molecular weight dextran, as by means of acid, it is dissolved in water to the extent of about 30% of the original fermentate volume and to the resulting viscous solution there is added sufficient strong sodium hydroxide to raise the pH to 6.8-7.0. The hydrolysis is then effected by heating the neutral solution until a constant temperature of 75° C. to 85° C. is attained, maintaining the solution at the elevated temperature during adustment of the pH to the acid side, by the addition of strong mineral acid such as hydrochloric or sulfuric acid, and holding the solution at hydrolysis temperature until the partial hydrolysis has proceeded to the desired extent. The temperature, time, and pH are interdependent and may vary depending on the molecular weight or average molecular weight desired for the hydrolyzate or desired fraction of the hydrolyzate. When dextran of molecular weight adapted to clinical use is desired, the pH of the solution may be adjusted to 1.04 to 1.26, the solution is maintained at 75° C. to 85° C. for about one hour. As will be understood, it may be desired to partially hydrolyze the native dextran to the extent that none of the fractions comprising the hydrolyzate has a molecular weight acceptable for clinical purposes but all of which may be satisfactory for various industrial applications.

After heating, or when the hydrolysis has proceeded to the predetermined extent, the splitting action of the acid on the dextran may be interrupted by adding, promptly, a sodium hydroxide solution in an amount and of NaOH concentration to adjust the pH to 6.8-7.0. The neutral solution is then cooled to 35° C. to 40° C.

When the solution contains dextran of molecular weight in the clinical range it is preferably decolorized, de-ionized and clarified before being spray-dried or otherwise treated to obtain the dextran in the form of a dry powder. As will be understood, these special purifying after-treatments may be omitted when the hydrolyzed dextran is destined for industrial purposes, at least in some instances and depending on the intended use, the cooled neutral solution being spray-dried directly after cooling thereof, or otherwise treated to recover the dextran in particulate form.

Decoloration may be effected by passing the cooled, neutral solution through a charcoal bed. The at least partially decolorized solution may be de-ionized by passing it through a bed or column of any efficient anionic and cationic exchange mineral or resin. Further clarification may finally be achieved by passing the decolorized, de-ionized solution through a bed of diatomaceous earth.

Whether subjected to these purifying refinements or not, the solution of the hydrolyzed dextran may be spray-dried and the partially degraded dextran may be precipitated from the aqueous solution by the addition of isopropanol, dehydrated by successive treatments with acetone and isopropanol, and finally dried under vacuum at 50° C. to 80° C.

In the production of clinical dextran by the method and under the conditions outlined, it is necessary to fractionate the partial hydrolyzate to separate the clinically acceptable material from the dextran of molecular weight higher and lower than is prescribed for intravenous injection. This fractionation may be accomplished during precipitation of the dextran from the hydrolysis solution by adding the precipitant successively in controlled amounts in which the dextran fractions of different molecular weight ranges are insoluble, to thus bring down, successively, the particular fractions. Thus, if the hydrolysis is effected under the specific conditions given for the production of clinical dextran (dextran of molecular weight between 20,000 and 200,000; average 60,000 to 80,000), that dextran fraction may be separated from the hydrolyzate by adding isopropanol to the neutral aqueous solution in an amount to precipitate the undesired (for clinical use, at least) higher molecular weight material, removing that precipitate by filtration, and then adding an additional quantity of isopropanol to precipitate the desired clinical dextran. This latter precipitate, after separation by filtration, may be suitably dehydrated, preferably by means of acetone, and then granulated. Or the precipitate may be re-dissolved in water and spray-dried.

In this process, when the 15% to 30% of isopropanol is added to the fermentate to render the same relatively fluid and insolubilize impurities some, usually a comparatively very small amount of the dextran of highest molecular weight may be precipitated and removed when the insoluble impurities are filtered or centrifuged off. This is not a disadvantage when the crude dextran is to be hydrolyzed to dextran of lower molecular weight, but is actually advantageous since it simplifies the hydrolysis by eliminating some of the extremely high molecular weight dextran to be split or cleaved.

It will be understood, of course, that the present improvement is not important only when the crude dextran is to be partially hydrolyzed to lower molecular weight dextran. Insolubilization of the nitrogenous and other impurities in the fermentate while lowering the viscosity thereof for ready handling, and separation of these insoluble substances from the fermentate prior to precipitation of any appreciable amount of the crude dextran is important since it is invariably preferred to free the dextran of impurities regardless of the subsequent treatment to which it may be subjected or the use for which it is intended, and it is simpler and, in the long run, more economical and time-saving to remove the impurities from the fermentate and avoid precipitation thereof with the dextran than to remove any appreciable amount of the impurities from the dextran after precipitation thereof. For example, even when the dextran is to be used in the native condition for various industrial purposes, or when it is to be hydrolyzed in some way other than by acid as when the hydrolysis is to be effected by enzyme action, removal of the impurities is desirable and this is most satisfactorily achieved by the instant method of removing the impurities, or the bulk of them, from the fermentate before precipitating the dextran.

The discussion has so far been concerned with the production of dextran under the conventional conditions leading to a native dextran of very high molecular weight. In any process involving synthesis of the dextran from sucrose or the like by the action of a dextran-producing microorganism or its enzyme, the impurities occur in the nutrient medium or fermentate together with the dextran formed therein. The present improvement involving the addition of the limited concentration of alcohol or ketone, and preferably isopropanol, to the medium for decreasing the viscosity to render the same capable of being rapidly and effectively filtered or centrifuged and insolubilizing impurities, and separation of the insolubilized impurities prior to precipitation of the dextran, may be practiced in connection with all such syntheses including those conducted under special conditions controlled to yield a native dextran having a molecular weight that is lower than that of the native dextran obtained under the conventional conditions. The amount of isopropanol in the range 15% to 30% by weight is selected so that the viscosity is decreased and the impurities are insolubilized and removed without any substantial precipitation of the particular dextran.

While the preferred amount of inoculum to be added to the sucrose-bearing nutrient has been given herein as between 5% and 10%, amounts between 2% and 15% may be used. When 2% of the culture is added to the nutrient, somewhat longer fermentation periods are needed for satisfactory dextran yield and the fermentation time required is generally in excess of 48 hours. At a 15% inoculum concentration, shorter fermentation periods are possible, about 16 hours being suitable, but the dextran yield is reduced to side reactions. For these reasons, a 5% to 10% inoculum concentration is preferred.

The invention is not limited to use of any particular dextran-producing microorganism. *Leuconostoc mesenteroides* B-512 (NRRL) has been illustrated and is usually preferred when clinical dextran is to be produced. However, the nutrient may be inoculated with a culture of other strains of *Leuconostoc mesenteroides* (or with the enzyme thereof) including the strains bearing the following NRRL designations: *L. m.* B-119, B-1146, B-1190, B-742, B-1191, B-1196, B-1208, B-1216, B-1120, B-1144 and B-523 as well as of *Streptobacterium dextranicum* B-1254 and *Betabacterium vermiforme* B-1139.

This application is a continuation-in-part of our application Ser. No. 240,579, filed August 6, 1951.

Various changes and modifications may be made in specific details given in carrying out the invention. Since such variations may be made without departing from the spirit and scope of the invention, it is to be understood that we do not intend to limit the invention except as defined in the appended claims.

What is claimed is:

1. In the isolation of native dextran from a normally highly viscous crude fermentation product containing, in addition to the dextran, insoluble and normally soluble nitrogenous and other impurities, the improvement which consists in adding from about 15% to about 30% by weight, based on the fermentate weight, of a substance selected from the group consisting of water-miscible aliphatic alcohols and ketones to the fermentate to insolubilize the normally soluble impurities and render the mass relatively fluid without precipitating any appreciable quantity of the dextran, and then mechanically separating the insoluble impurities from the fermentate prior to precipitating the dextran therefrom.

2. The method according to claim 1, characterized in that the insoluble impurities are separated from the fermentate by filtration.

3. The method according to claim 1, characterized in that the insoluble impurities are separated from the fermentate by centrifuging.

4. In the isolation of native dextran from a normally highly viscous crude fermentation product containing, in addition to the dextran, insoluble and normally soluble nitrogenous and other impurities, the improvement which consists in adding from about 15% to about 30% by weight of isopropanol, based on the fermentate weight to the fermentate to insolubilize the soluble impurities and render the mass relatively fluid without precipitating any appreciable quantity of the dextran, and then mechanically separating the insoluble impurities from the fermentate prior to precipitating the dextran therefrom.

5. The method according to claim 4, characterized in that the insoluble impurities are separated from the fermentate by filtration.

6. The method according to claim 4, characterized in that the insoluble impurities are separated from the fermentate by centrifuging.

7. The method of recovering substantially pure native dextran from a normally highly viscous crude fermentation product containing, in addition to the dextran, insoluble and normally soluble nitrogenous and other impurities, which consists in adding from about 15% to about 30% by weight, based on the fermentate weight, of a substance selected from the group consisting of water-miscible aliphatic alcohols and ketones to the fermentate to insolubilize the soluble impurities and render the mass relatively fluid without precipitating any appreciable amount of the dextran, mechanically separating the insoluble impurities from the fermentate, thereafter adding to the residual dextran solution an amount of the substance selected from the group consisting of water-miscible aliphatic alcohols and ketones such that the total concentration thereof is sufficiently high to precipitate the native dextran, and separating the precipitated dextran from the supernatant.

8. The method according to claim 7, characterized in that the insoluble impurities are separated from the fermentate by filtration.

9. The method according to claim 7, characterized in that the insoluble impurities are separated from the fermentate by centrifuging.

10. The method of recovering substantially pure native dextran from a normally highly viscous crude fermentation product containing, in addition to the dextran, insoluble and normally soluble nitrogenous and other impurities, which consist in adding from about 15% to about 30% by weight of isopropanol, based on the fermentate weight, to the fermentate to insolubilize the soluble impurities and render the mass relatively fluid without precipitating any appreciable amount of the dextran, mechanically separating the insoluble impurities from the fermentate, adding an amount of isopropanol to the residual dextran solution such that the total isopropanol concentration is sufficient to precipitate substantially all of the dextran and separating the precipitated dextran from the supernatant.

11. The method according to claim 10, characterized in that the insoluble impurities are separated by filtration.

12. The method according to claim 10, characterized in that the insoluble impurities are separated by centrifuging.

13. The method of recovering substantially pure native dextran from a normally highly viscous crude fermentation product containing, in addition to the dextran, insoluble and normally soluble nitrogenous and other impurities, which consist in adding from about 15% to about 30% by weight of isopropanol, based on the fermentate weight, to the fermentate to insolubilize the soluble impurities and render the mass relatively fluid without precipitating any substantial amount of the dextran, holding the fermentate containing the isopropanol at room temperature for about 30 minutes to one hour and until the soluble impurities are insolubilized, mechanically separating the insoluble impurities from the fermentate, adding isopropanol to the residual dextran solution in an amount such that the total isopropanol concentration is sufficient to precipitate substantially all of the dextran, and separating the precipitated dextran from the supernatant.

14. The method according to claim 13, characterized in that the insoluble impurities are separated from the fermentate by filtration.

15. The method according to claim 13, characterized in that the insoluble impurities are separated from the fermentate by centrifuging.

References Cited in the file of this patent

UNITED STATES PATENTS

| | | |
|---|---|---|
| 2,392,258 | Owen et al. | Jan. 1, 1946 |
| 2,565,507 | Lockwood et al. | Aug. 28, 1951 |
| 2,644,815 | Gronwall et al. | July 7, 1953 |

OTHER REFERENCES

Carruthers: Biochemical Jour., v. 30, pp. 1001–09 (1930).